US007239864B2

(12) United States Patent
Zhang

(10) Patent No.: US 7,239,864 B2
(45) Date of Patent: Jul. 3, 2007

(54) SESSION KEY MANAGEMENT FOR PUBLIC WIRELESS LAN SUPPORTING MULTIPLE VIRTUAL OPERATORS

(75) Inventor: Junbiao Zhang, Bridgewater, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/524,188

(22) PCT Filed: Aug. 13, 2003

(86) PCT No.: PCT/US03/25254

§ 371 (c)(1),
(2), (4) Date: Feb. 10, 2005

(87) PCT Pub. No.: WO2004/017617

PCT Pub. Date: Feb. 26, 2004

(65) Prior Publication Data

US 2006/0161771 A1   Jul. 20, 2006

Related U.S. Application Data

(60) Provisional application No. 60/403,495, filed on Aug. 14, 2002.

(51) Int. Cl.
  *H04M 1/66* (2006.01)
(52) U.S. Cl. ............... 455/411; 455/410; 455/426.1; 455/426.2; 713/171; 713/168

(58) Field of Classification Search ............... 455/411, 455/410, 426.1, 426.2, 435.1, 41.2, 419; 713/171, 168
See application file for complete search history.

(56) References Cited

U.S. PATENT DOCUMENTS

| 6,694,134 | B1 * | 2/2004 | Lu et al. ............. 455/419 |
| 2002/0035699 | A1 * | 3/2002 | Crosbie ............. 713/201 |
| 2002/0037708 | A1 * | 3/2002 | McCann et al. ......... 455/411 |
| 2002/0094777 | A1 | 7/2002 | Cannon et al. |
| 2003/0039234 | A1 * | 2/2003 | Sharma et al. ......... 455/411 |
| 2003/0235305 | A1 * | 12/2003 | Hsu ............. 380/247 |
| 2003/0236982 | A1 * | 12/2003 | Hsu ............. 713/171 |

OTHER PUBLICATIONS

Search Report Dated Nov. 12, 2003.

* cited by examiner

*Primary Examiner*—Joseph Feild
*Assistant Examiner*—Huy D Nguyen
(74) *Attorney, Agent, or Firm*—Joseph J. Laks; Robert D. Shedd; Catherine A. Ferguson

(57) ABSTRACT

A method and apparatus for managing a session key for allowing a mobile terminal to access a wireless local area network (WLAN). The invention provides for establishing a first secure channel between an access point and a virtual operator, and suggesting a session key to the virtual operator from the access point. A second secure channel is established between the virtual operator and a user, and the session key is sent to the user via the second secure channel upon successful user authentication. The mobile terminal accesses the WLAN using the session key.

12 Claims, 3 Drawing Sheets

SESSION KEY MANAGEMENT FOR PUBLIC WIRELESS LAN SUPPORTING MULTIPLE VIRTUAL OPERATORS

This application claims the benefit, under 35 U.S.C. § 365 of International Application PCT/US03/125254, filed Aug. 13, 2003, which was published in accordance with PCT Article 21 (2) on Feb. 26, 2004 in English and which claims the benefit of U.S. provisional patent application No. 60/403,495, filed Aug. 14, 2002.

FIELD OF THE INVENTION

The present invention generally relates to network communications and, more particularly, to a mechanism for managing access to session keys in a public wireless local area network (WLAN) environment that supports third party virtual operators.

BACKGROUND OF THE INVENTION

The current wireless local area network (WLAN) Authentication, Authorization, Accounting (AAA) solutions do not provide adequate support for WLAN operators to maintain business relationships with multiple virtual operators, and in particular, with respect to management of session keys used for WLAN access. Failure to properly control and mange the session keys could result in potential security and management problems.

WLANs are increasingly being deployed in hot spots such as hotels, airports and cafés. A sound and efficient AAA (Authentication, Authorization, Accounting) solution would be of great importance for enabling secure public wireless LAN access. In particular, such an AAA solution should be able to support a virtual operator concept in which third party providers such as ISPs, cellular operators and pre-paid card providers offer AAA services to the public WLANs and the wireless users. This way, wireless users do not have to open an account or pay by credit each time they go to a different hot spot; instead, they can use existing ISP accounts, cellular accounts or a pre-paid card purchased anywhere to gain access to the public WLAN. This could significantly increase the business opportunities for the WLAN operators as well as third party virtual operators. However, the current wireless LAN access solutions are all designed for local set-ups such as a corporate environment in which only a single authentication server is used. For example, the IEEE 802.11 standard body chooses IEEE 802.1x as the solution for WLAN access control, and the current usage models use authentication servers to control session key assignments. While this is sufficient for a corporate environment or the like, it is certainly problematic in a public hot spot where multiple authentication servers belonging to different business entities may coexist. It is very difficult, if at all possible, for these authentication servers to coordinate key assignments for an access point.

Current key distributions will now be described. In one scenario, a mobile user in a public WLAN hot spot does not have a prior trust relationship with the WLAN access point. The user intends to use a third party service provider (e.g. an Internet service provider (ISP)) as a trust bridging entity. A service provider may be referred to as a virtual operator. The user maintains an account with this virtual operator, which has a business relationship with the WLAN operator. Because the user has an established trust relationship with the virtual operator, she is able to authenticate herself with the virtual operator in a secure manner. The virtual operator then securely transmits a session key to the user as well as the WLAN access point (because the virtual operator also has a trust relationship with the WLAN). Because of this shared session key, the wireless LAN then knows that the user is authorized to access the network and thus grants access to the user. Note that in this scheme, the virtual operator assigns the session key since it has a trust relationship with both the user and the WLAN.

The session key is used for local access and should be local to the WLAN access point, e.g., assigned and maintained by the access point. When multiple virtual operators are present, the above mentioned key management scheme is problematic in at least two areas. First, for the virtual operator, it is often problematic to assign and manage session keys for tens of thousands of access points belonging to different entities, that is, to accommodate different encryption algorithms and key lengths for different types of access points. Secondly, for the access point, it may be difficult to make sure that multiple virtual operators assign session keys in a consistent manner, e.g. it has to make sure two users are not using the same key assigned by two different virtual operators at the same time.

A key difficulty is that the access point does not share a secret with the wireless user, thus it is not secure to directly send a session key from the access point to the user. In one solution to this problem is that the virtual operator notifies the access point (AP) about the user's public key upon successful user authentication. The AP then encrypts the session key using the user's public key and then sends the result to the user. Since only that specific user is able to decrypt the session key using her corresponding private key, the session key can be securely established between the AP and the wireless user. However, this scheme requires the use of public/private keys, which may not be compatible with the actual authentication methods between the wireless user and the authentication server. It is likely that the user has to maintain two different types of keys (private key for decrypting session key and password type of key for authenticating with the authentication server). This not only increases the client software complexity, but also increases the difficulty in securely maintaining keys. Further, this scheme does not work with IEEE 802.1x, which is becoming a standard in WLAN security.

Therefore, a need exists for a solution in which keys are locally assigned and managed by an access point, yet wireless users are able to securely obtain session keys without a prior trust relationship with the access point.

SUMMARY OF THE INVENTION

The invention describes an effective and efficient mechanism to address this problem. Session keys are assigned and managed locally by the WLAN (since these keys are used for local access control), yet they can be securely distributed to the wireless users who only maintain a trust relationship with their corresponding virtual operators.

A method for session key management for wireless local area networks includes establishing a first secure channel between an access point and a virtual operator, and suggesting a session key to the virtual operator from the access point. A second secure channel is established between the virtual operator and a user, and the session key is sent by the virtual operator to enable communications between the access point and the user.

A system for session key management for wireless local area networks includes an access point, which establishes a first secure channel between the access point and a virtual operator. A session key is suggested to the virtual operator from the access point. The virtual operator establishes a second secure channel between and a user upon authentication of the user, the virtual operator setting the session key to enable communications between the access point and the user.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention generally relates to network communications and, more particularly, to a mechanism for managing access session keys in a public wireless local area network (WLAN) environment that supports third party virtual operators. Such virtual operators may include Internet Service Providers (ISPs), cellular operators, or pre-paid card providers. To maximize revenue sources, a public wireless local area network (WLAN) may maintain business relationship with multiple virtual operators.

It is to be understood that the present invention is described in terms of a WLAN systems, such as those that comply with IEEE 802.11, Hiperlan 2, and/or Ultrawide band standards; however, the present invention is much broader and may be applicable to other system management schemes for other communications systems. In addition, the present invention may be applicable to any network system including telephone, cable, computer (Internet), satellite, etc.

Figure 1:
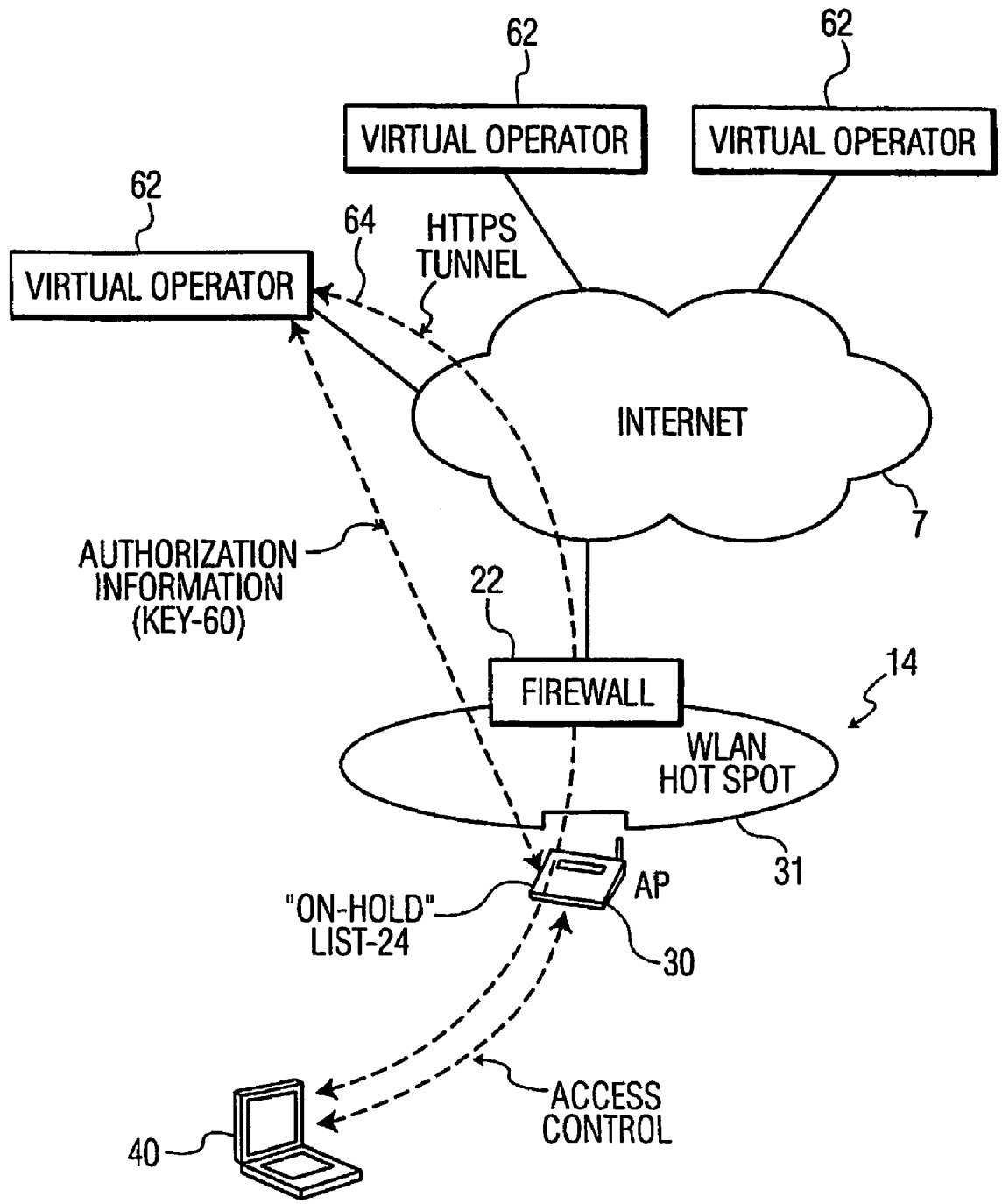
FIG. 1 is an exemplary system in accordance with one embodiment of the present invention.

Referring now in specific detail to the drawings in which like reference numerals identify similar or identical elements throughout the several views, and initially to FIG. 1, a wireless local area network (WLAN) 14 includes an access point 30 for a WLAN hot spot 31. WLAN 14 may employ, for example, IEEE 802.11 and HIPERLAN2 standards. WLAN 14 may include a firewall 22 between external networks, such as, for example, the Internet 7. End users or mobile units 40 may access virtual operators 62 from WLAN 14 through the Internet 7 using, for example, HTTPS tunnels or other secured channels 64, as will be described herein.

Dispersed between or within cells of a cellular network are wireless local area networks 14. In accordance with the present invention, a session key 60 is sent from a virtual operator 62 to a user 40. Virtual operators 62 may include Internet Service Providers (ISPs), cellular operators, or pre-paid card providers or other entities, which provide services over a communications network. To maximize revenue sources, a public wireless local area network (WLAN) may maintain business relationship with multiple virtual operators. However, maintaining a plurality of virtual operators is difficult while maintaining adequate system security.

Because the virtual operator 62 and the user (MS 40) share a secret, such as a secured channel or using a shared piece of information or code, the key 60 can be transmitted through a secure channel 64 between them. However, instead of having the virtual operator 62 determining and maintaining the session key 60, the keys are chosen by WLAN access points 30 and then hinted to the virtual operator. Keys may be chosen by a plurality of methods, including, for example, random number generation, selecting from a pre-stored number of keys, etc.

Figure 2:
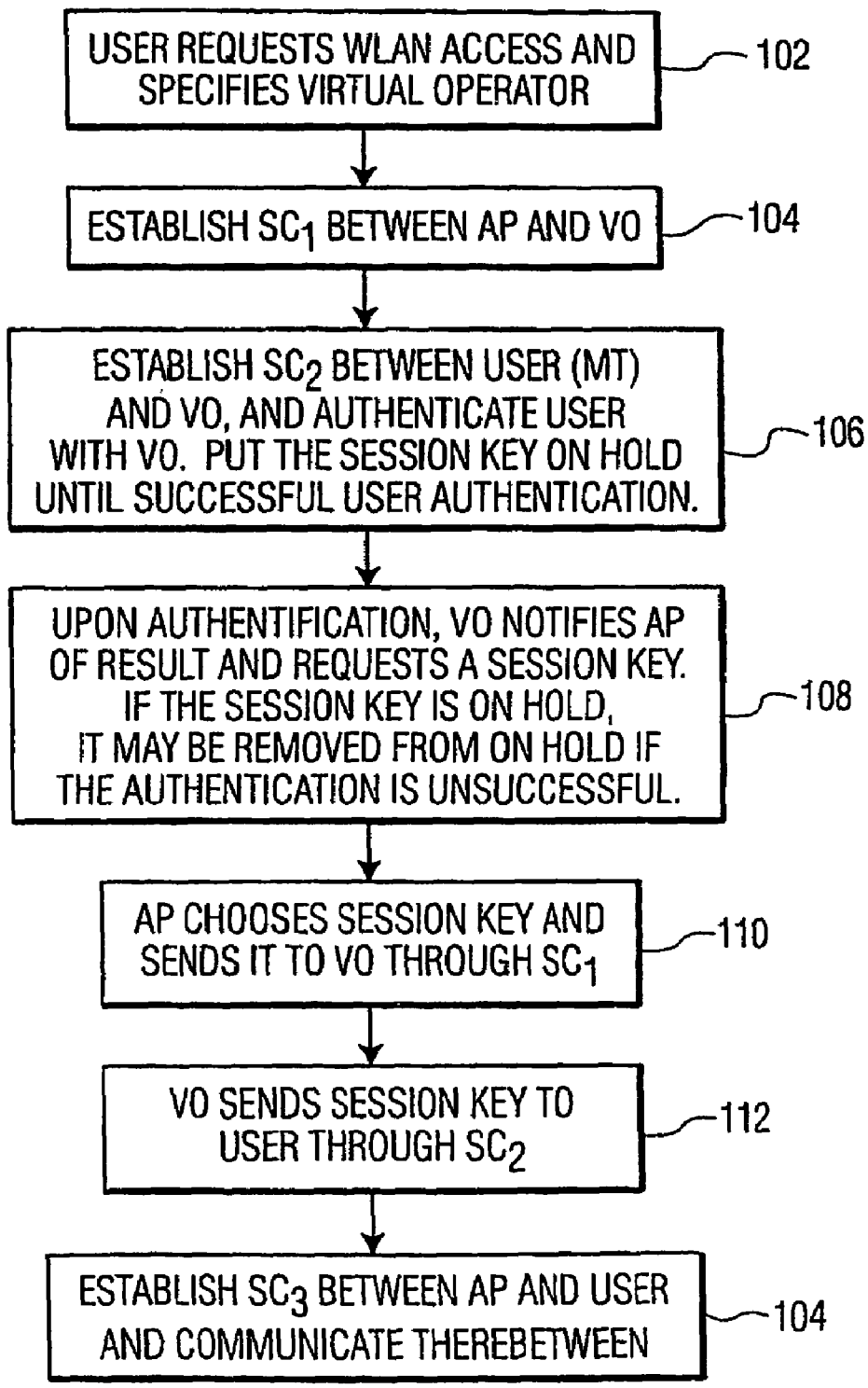
FIG. 2 is a flowchart of illustrative steps for implementing the method for session key management in accordance with one embodiment of the present invention.

Referring to FIG. 2, an embodiment for implementing the present invention is illustratively described as follows. In block 102, a user (mobile terminal (MT)) requests wireless LAN access at an access point (AP) 30 and specifies a virtual operator (VO) 62. In block 104, the AP 30 establishes a secure channel $SC_1$ with the virtual operator 62. All subsequent communication between the AP 30 and the virtual operator 62 will be through $SC_1$. In block 106, the user establishes a secure channel $SC_2$ with the virtual operator 62 and authenticates herself with the virtual operator through $SC_2$. This may include putting the session key on hold until successful user authentication.

In block 108, the virtual operator, upon successful user authentication, notifies the AP 30 about the result and asks the AP 30 for a session key 60 through $SC_1$. If the session key is on hold, it may be removed from on hold if the authentication is unsuccessful. In block 110, the AP 30 chooses a session key 60 and sends it to the virtual operator 62 through $SC_1$. In block 112, the virtual operator sends this session key to the user through $SC_2$. In block 114, the user and the AP 30 start using the session key for the subsequent communication between them (secure channel $SC_3$).

Figure 3:
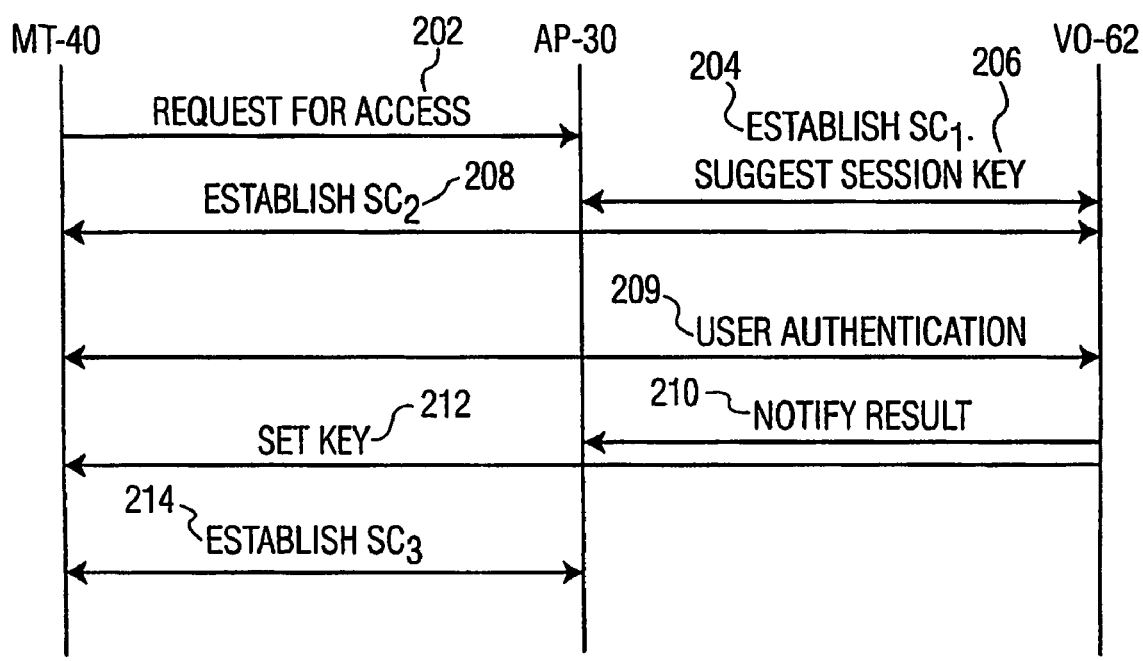
FIG. 3 is a diagram of another illustrative method for session key management for wireless local area networks in accordance with another embodiment of the present invention.

Referring to FIG. 3, the method as shown in FIG. 2 may be further improved for speed and efficiency as illustrated. Instead of having the virtual operator ask for the session key after successful authentication, the AP 30 provides a suggested session key right after $SC_1$ is established and puts this key "on hold" in memory 24 at access point 30. Upon successful user authentication, the AP 30 is notified by the virtual operator and starts using this key for $SC_3$. In case of an unsuccessful authentication (e.g., after a certain number of unsuccessful tries by the user), the AP 30 is also notified and removes the key from the "on hold" list 24. This prevents a denial-of-service attack in which an attacker continuously makes unsuccessful authentication attempts. If the AP is not notified about unsuccessful authentication, the suggested keys would pile up in the AP's memory storage. The authentication steps may include the following.

In step 202, a user requests wireless LAN access at an AP 30 and specifies virtual operator 62. In step 204, AP 30 establishes a secure channel $SC_1$ with the virtual operator 62. All subsequent communication between the AP and the virtual operator will be through $SC_1$. In step 206, the AP 30 sends a suggested session key to the virtual operator 62 and puts this key "on hold". In step 208, the user establishes a secure channel $SC_2$ with the virtual operator 62 and authenticates herself with the virtual operator 62 through $SC_2$ in block 209. In step 210, the virtual operator 62 notifies the AP 30 about the authentication result, and the AP 30 removes the suggested key from the "on hold" list. In block 212, in case of successful authentication, the virtual operator 62 sends the session key to the user. In block 214, the user and the AP 30 start using the session key for the subsequent communication between them (secure channel $SC_3$).

The reason that the method of FIG. 3 is more efficient is because it saves one round trip of communication time from the method of FIG. 2, e.g., the virtual operator does not have to wait until the end of the authentication, to ask the AP for the session key, then notify the user about the key. Although in step 206, the AP needs to send to the virtual operator the suggested key, it can be done in parallel with step 208. Thus overall, a round trip delay is avoided. In other embodiments step 206, may be performed sequentially with step 208.

It is to be understood that the present invention may be implemented in various forms of hardware, software, firmware, special purpose processors, or a combination thereof, for example, within a mobile terminal, access point, and/or a cellular network. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying Figures may be implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Having described preferred embodiments for session key management for public wireless LAN supporting multiple virtual operators (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for managing a session key used for enabling communications between a mobile terminal and an access point in a wireless local area network ("WLAN"), comprising the steps of:
   receiving a request for access to the WLAN from the mobile terminal;
   determining a virtual operator associated with the access request;
   establishing a first secure channel between the access point and the virtual operator;
   requesting user authentication from the virtual operator via the first secure channel, wherein the virtual operator communicates with the mobile terminal via a second secure channel to authenticate the mobile terminal;
   selecting a session key and sending the session key to the virtual operator via the first secure channel, wherein the virtual operator sends the session key to the mobile terminal via the second secure channel; and
   communicating with the mobile terminal using the session key;
   wherein the step of requesting user authentication is performed in parallel with the step of selecting and sending the session key.

2. The method according to claim 1, wherein the communicating step comprises communicating with the mobile terminal using the session key upon receiving notification of successful user authentication from the virtual operator.

3. The method according to claim 1, wherein the step of selecting a session key comprises placing the session key on hold until notification of successful user authentication from the virtual operator, and upon notification removing the session key from on hold and sending the session key to the virtual operator.

4. The method according to claim 3, further comprising the step of removing the session key from on hold if the authentication is successful.

5. The method according to claim 1, wherein the virtual operator includes one of an Internet Service Provider, a cellular provider and a credit card provider.

6. A method for managing a session key used for enabling communications between a mobile terminal and an access point in a wireless local area network ("WLAN"), comprising the steps of:
   receiving a request for access to the WLAN from the mobile terminal;
   determining a virtual operator associated with the access request;
   establishing a first secure channel between the access point and the virtual operator;
   requesting user authentication from the virtual operator via the first secure channel, wherein the virtual operator communicates with the mobile terminal via a second secure channel to authenticate the mobile terminal;
   selecting a session key and sending the session key to the virtual operator via the first secure channel, wherein the virtual operator sends the session key to the mobile terminal via the second secure channel; and
   communicating with the mobile terminal using the session key;
   wherein the step of selecting a session key and sending the session key to the virtual operator via the first secure channel is performed only after receiving notification of successful user authentication from the virtual operator.

7. An apparatus for managing a session key used for enabling communications between a mobile terminal and a wireless local area network ("WLAN"), comprising:
   means for receiving a request for access to the WLAN from the mobile terminal;
   means for determining a virtual operator associated with the access request;
   first means for communicating with the virtual operator via a first secure channel, the first communicating means requesting user authentication from the virtual operator via the first secure channel, wherein the virtual operator communicates with the mobile terminal via a second secure channel to authenticate the mobile terminal;

means, coupled to the first communicating means, for selecting a session key and sending the session key to the virtual operator via the first secure channel, wherein the virtual operator sends the session key to the mobile terminal via the second secure channel; and second means for communicating with the mobile terminal using the session key;

wherein the first communicating means requests user authentication in parallel with selecting means selecting and sending the session key.

8. The apparatus according to claim 7, wherein the second communicating means communicates with the mobile terminal using the session key upon receiving notification of successful user authentication from the virtual operator.

9. The apparatus according to claim 7, wherein the selecting means places the session key on hold until notification of successful user authentication from the virtual operator, and upon notification removes the session key from on hold and sends the session key to the virtual operator.

10. The apparatus according to claim 9 wherein the selecting means removes the session key from on hold if the authentication is successful.

11. The apparatus according to claim 7, wherein the virtual operator includes one of an Internet Service Provider, a cellular provider and a credit card provider.

12. An apparatus for managing a session key used for enabling communications between a mobile terminal and a wireless local area network ("WLAN"), comprising:

means for receiving a request for access to the WLAN from the mobile terminal;

means for determining a virtual operator associated with the access request;

first means for communicating with the virtual operator via a first secure channel, the first communicating means requesting user authentication from the virtual operator via the first secure channel, wherein the virtual operator communicates with the mobile terminal via a second secure channel to authenticate the mobile terminal;

means, coupled to the first communicating means, for selecting a session key and sending the session key to the virtual operator via the first secure channel, wherein the virtual operator sends the session key to the mobile terminal via the second secure channel; and second means for communicating with the mobile terminal using the session key wherein the selecting means selects a session key and sends the session key to the virtual operator via the first secure channel only after receiving notification of successful user authentication from the virtual operator.

* * * * *